United States Patent
Yamamoto

(10) Patent No.: US 10,020,521 B2
(45) Date of Patent: Jul. 10, 2018

(54) FUEL CELL COGENERATION SYSTEM, METHOD OF STARTING OPERATION OF THE FUEL CELL COGENERATION SYSTEM, AND METHOD OF OPERATING THE FUEL CELL COGENERATION SYSTEM

(71) Applicant: HONDA MOTOR CO., LTD., Tokyo (JP)

(72) Inventor: Takeyoshi Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 15/231,956

(22) Filed: Aug. 9, 2016

(65) Prior Publication Data

US 2017/0047597 A1 Feb. 16, 2017

(30) Foreign Application Priority Data

Aug. 13, 2015 (JP) .................... 2015-159959

(51) Int. Cl.
| | |
|---|---|
| *H01M 8/04029* | (2016.01) |
| *H01M 8/04007* | (2016.01) |
| *H01M 8/04701* | (2016.01) |
| *H01M 8/0606* | (2016.01) |
| *H01M 8/04223* | (2016.01) |

(Continued)

(52) U.S. Cl.
CPC ... *H01M 8/04029* (2013.01); *H01M 8/04052* (2013.01); *H01M 8/04268* (2013.01); *H01M 8/04373* (2013.01); *H01M 8/04708* (2013.01); *H01M 8/04753* (2013.01); *H01M 8/0606* (2013.01); *H01M 2008/1293* (2013.01); *H01M 2250/405* (2013.01); *Y02B 90/16* (2013.01)

(58) Field of Classification Search
CPC .............................................. H01M 2250/405
See application file for complete search history.

(56) References Cited

U.S. PATENT DOCUMENTS

| | | | |
|---|---|---|---|
| 2006/0147772 A1 | 7/2006 | Takemoto | |
| 2008/0118800 A1* | 5/2008 | Devriendt | H01M 8/04014 429/423 |

(Continued)

FOREIGN PATENT DOCUMENTS

| | | |
|---|---|---|
| EP | 1 351 328 B1 | 3/2011 |
| JP | 2006-179198 | 7/2006 |

(Continued)

OTHER PUBLICATIONS

German Office Action and German Search Report dated May 8, 2017, 21 pages.

(Continued)

*Primary Examiner* — Stewart A Fraser
*Assistant Examiner* — Victoria Hom Lynch
(74) *Attorney, Agent, or Firm* — Rankin, Hill & Clark LLP

(57) ABSTRACT

A fuel cell cogeneration system includes a fuel cell module, a heat exchanger, a hot water tank, a circulating water channel, and an oxygen-containing gas supply channel. A circulating water heater for heating water is provided on the circulating water channel. Part of the oxygen-containing gas supply channel is provided in the circulating water heater to thereby allow air flowing through the oxygen-containing gas supply channel to be heated by receiving heat from the circulating water heater.

8 Claims, 7 Drawing Sheets

(51) Int. Cl.
*H01M 8/0432* (2016.01)
*H01M 8/04746* (2016.01)
*H01M 8/124* (2016.01)

(56) References Cited

U.S. PATENT DOCUMENTS

| | | | | |
|---|---|---|---|---|
| 2008/0152961 A1* | 6/2008 | Zhou | ................ | H01M 8/04231 |
| | | | | 429/413 |
| 2011/0189555 A1 | 8/2011 | Baur et al. | | |
| 2015/0221965 A1* | 8/2015 | Kokubu | .............. | H01M 8/0432 |
| | | | | 429/429 |

FOREIGN PATENT DOCUMENTS

| | | |
|---|---|---|
| JP | 2011-091004 | 5/2011 |
| JP | 2012-501055 | 1/2012 |
| JP | 2013-105612 | 5/2013 |

OTHER PUBLICATIONS

English translation of German Search Report dated May 8, 2017, 8 pages.
Japanese Office Action dated Mar. 14, 2017 (English abstract included).

* cited by examiner

FC START-UP
[LOW TEMPERATURE]

FC START-UP
[NORMAL TEMPERATURE]

FC OPERATION
[LOW TEMPERATURE]

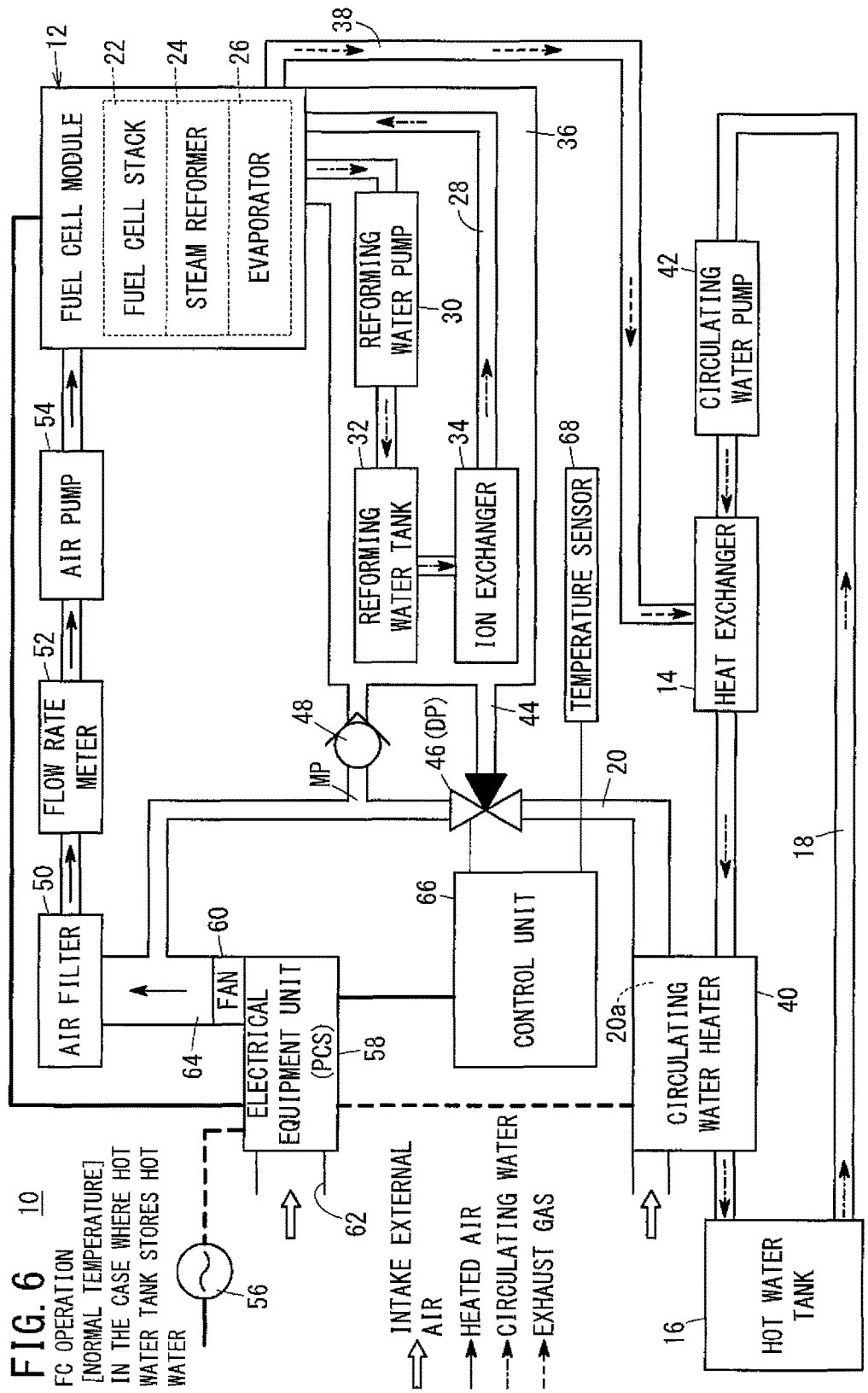

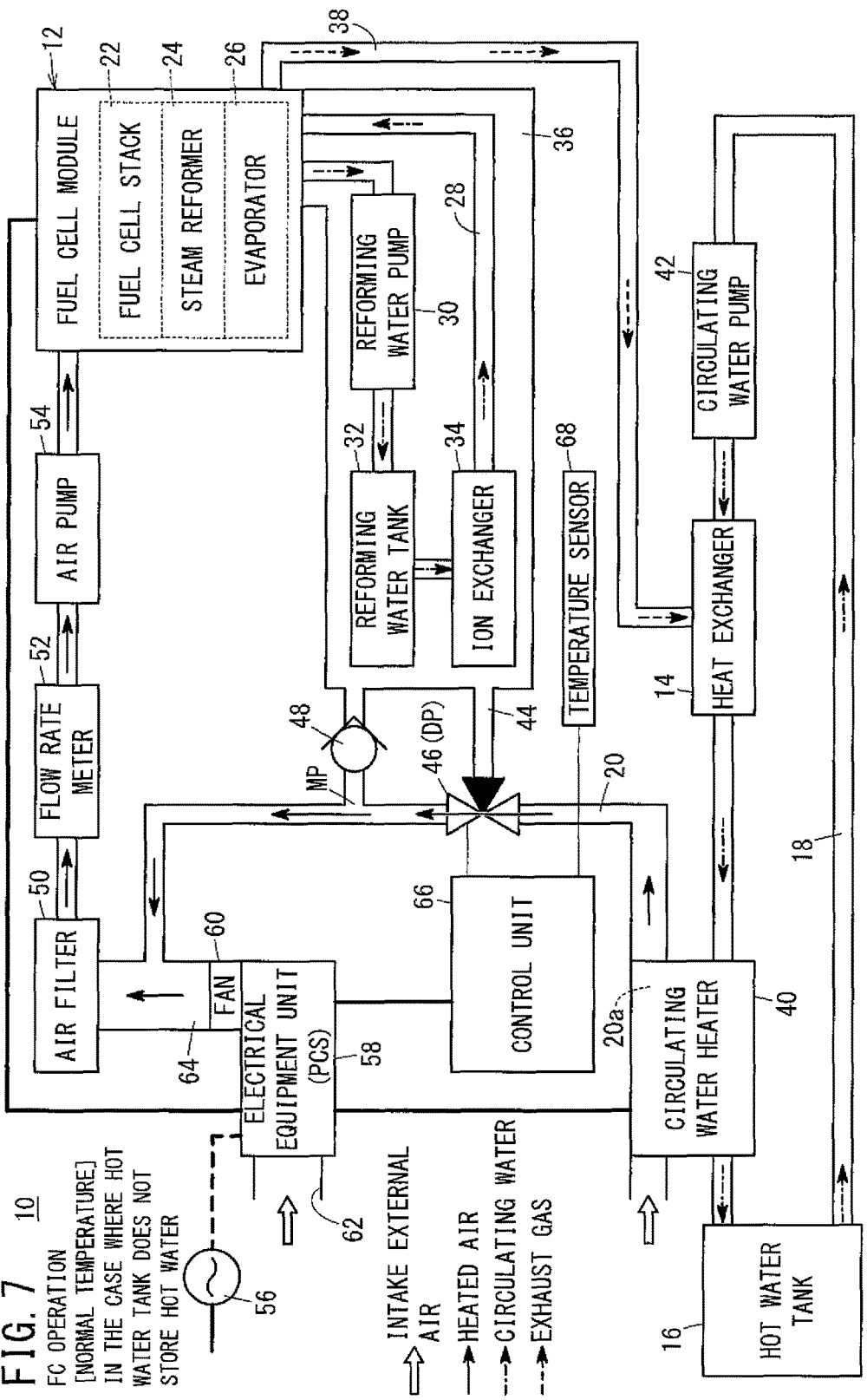

FUEL CELL COGENERATION SYSTEM, METHOD OF STARTING OPERATION OF THE FUEL CELL COGENERATION SYSTEM, AND METHOD OF OPERATING THE FUEL CELL COGENERATION SYSTEM

CROSS-REFERENCE TO RELATED APPLICATION

This application is based upon and claims the benefit of priority from Japanese Patent Application No. 2015-159959 filed on Aug. 13, 2015, the contents of which are incorporated herein by reference.

BACKGROUND OF THE INVENTION

Field of the Invention

The present invention relates to a fuel cell cogeneration system including a fuel cell module for generating electric power by electrochemical reactions of a fuel gas and an oxygen-containing gas, a method of starting operation of the fuel cell cogeneration system, and a method of operating the fuel cell cogeneration system.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (hereinafter also referred to as an MEA). The electrolyte electrode assembly is sandwiched between separators (bipolar plates). In use of such fuel cells, generally, predetermined numbers of the electrolyte electrode assemblies and the separators are stacked together to form a fuel cell stack, which is applied to a fuel cell module.

The SOFC is operated at relatively high temperature. The exhaust gas including fuel gas and oxygen-containing gas consumed in the power generation reaction has high temperature as well. Therefore, it is desired to achieve effective utilization of the exhaust gas.

For example, systems having a heat exchanger for performing heat exchange between the exhaust gas from the SOFC and water, and a hot water tank storing the water have been adopted. The water in the hot water tank is heated by the heat exchange to produce hot water having a predetermined temperature. The hot water is supplied to a hot water system or a heating system for home use. That is, the systems are fuel cell cogeneration systems.

In the fuel cell, it takes considerable time to warm up the fuel cell to a desired operational temperature after starting operation of the fuel cell. For example, in the case of starting operation of the fuel cell at low temperature such as a temperature below the freezing point, etc., or in the case where a SOFC, which has a high operating temperature, is used, the start-up time required for starting operation of the fuel cell is significantly long.

In this regard, for example, a fuel cell system disclosed in Japanese Laid-Open Patent Publication No. 2006-179198 (hereinafter referred to as the conventional technique) is known. In this conventional technique, at the time of starting operation, a coolant flows through a bypass channel. Then, power generation of a fuel cell stack is started. Further, operation of a heating apparatus is started to thereby heat the coolant circulating to bypass the fuel cell. When the temperature of the coolant reaches a predetermined temperature or more, the flow of the coolant is switched to a channel passing through the fuel cell stack.

According to the disclosure, in the structure, it becomes possible to prevent the cold coolant from flowing into the fuel cell stack, and self-heating of the fuel cell stack by power generation is facilitated. Further, according to the disclosure, the bypass channel and the coolant inside the bypass channel have smaller heat capacity in comparison with the fuel cell stack itself and the coolant inside the fuel cell stack, and therefore heating of the bypass channel and the coolant inside the bypass channel can be performed in a relatively short period of time even if a heating apparatus having a small heat capacity is used.

SUMMARY OF THE INVENTION

However, in the above conventional technique, since the coolant is heated to the predetermined temperature, in particular, the SOFC operated at high temperature cannot be heated to a desired temperature rapidly.

The present invention has been made to solve the problem of this type, and an object of the present invention is to provide a fuel cell cogeneration system, a method of starting operation of the fuel cell cogeneration system, and a method of operating the fuel cell cogeneration system in which it is possible to reduce the start-up time suitably, and perform efficient power generation operation economically.

A fuel cell cogeneration system according to the present invention includes a fuel cell module, a heat exchanger, a hot water tank, a circulating water channel, and an oxygen-containing gas supply channel. The fuel cell module generates electric power by electrochemical reactions of a fuel gas and an oxygen-containing gas. The heat exchanger heats water by heat exchange with exhaust heat discharged from the fuel cell module to thereby produce hot water. The hot water tank discharges the water and stores the hot water. The circulating water channel sends the water discharged from the hot water tank to the heat exchanger, and returns the hot water obtained in the heat exchanger to the hot water tank. The oxygen-containing gas supply channel supplies the oxygen-containing gas to the fuel cell module.

The fuel cell cogeneration system further includes a circulating water heater provided on the circulating water channel and configured to heat the water. Further, part of the oxygen-containing gas supply channel is provided in the circulating water heater for allowing the oxygen-containing gas flowing through the oxygen-containing gas supply channel to be heated by receiving heat from the circulating water heater.

Further, according to the present invention, there are further provided a method of starting operation of the fuel cell cogeneration system, and a method of operating the fuel cell cogeneration system.

The fuel cell cogeneration system includes a fuel cell module, a steam reformer, a reforming water chamber, a heat exchanger, a hot water tank, a circulating water channel, a circulating water heater, an oxygen-containing gas supply channel, and a bypass channel.

In the method of starting operation of the fuel cell cogeneration system, if it is determined that operation of the fuel cell module has been started, it is determined whether or not the internal temperature of the fuel cell cogeneration system is a predetermined temperature or less. Then, if it is determined that the internal temperature of the reforming water chamber is the predetermined temperature or less, the circulating water heater is turned on, and the bypass channel is opened to (communicated with) the oxygen-containing gas supply channel. If it is determined that the internal temperature of the reforming water chamber is not the predetermined temperature or less, the circulating water heater is turned on, and the bypass channel is closed with respect to (disconnected from) the oxygen-containing gas supply channel.

Further, in the operating method according to the present invention, if it is determined that the fuel cell module is in a steady operating state, it is determined whether or not the internal temperature of the fuel cell cogeneration system is a predetermined temperature or less. If it is determined that the internal temperature of the fuel cell cogeneration system is the predetermined temperature or less, the circulating water heater is turned on, and the bypass channel is opened to the oxygen-containing gas supply channel.

In the present invention, the oxygen-containing gas flowing through the oxygen-containing gas supply channel is heated by receiving heat from the circulating water heater. Therefore, the heated oxygen-containing gas can heat the fuel cell module. Thus, it becomes possible to suitably reduce the time required for starting operation of the fuel cell module. Further, the oxygen-containing gas can be heated by the circulating water heater used for heating the circulating water, and no dedicated heating apparatus for the oxygen-containing gas is required. Thus, the fuel cell cogeneration system can perform efficient power generation operation economically.

Further, in the present invention, at the time of starting operation at low temperature, the heated oxygen-containing gas can flow through the reforming water chamber at low temperature, and it becomes possible to prevent freezing of the reforming water. Further, the water flowing through the circulating water channel is heated by the circulating water heater, and the hot water tank can store the hot water.

Further, in the present invention, during operation at low temperature, the heated oxygen-containing gas can flow through the reforming water chamber at low temperature, and it becomes possible to prevent freezing of the reforming water. Moreover, the water flowing through the circulating water channel is heated by the circulating water heater, and the hot water tank can store the hot water.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is an explanatory diagram illustrating operation at normal temperature in a situation where a hot water tank stores hot water; and FIG. 7 is an explanatory diagram illustrating operation at normal temperature in a situation where the hot water tank does not store hot water.

DESCRIPTION OF THE PREFERRED EMBODIMENTS

Figure 1:
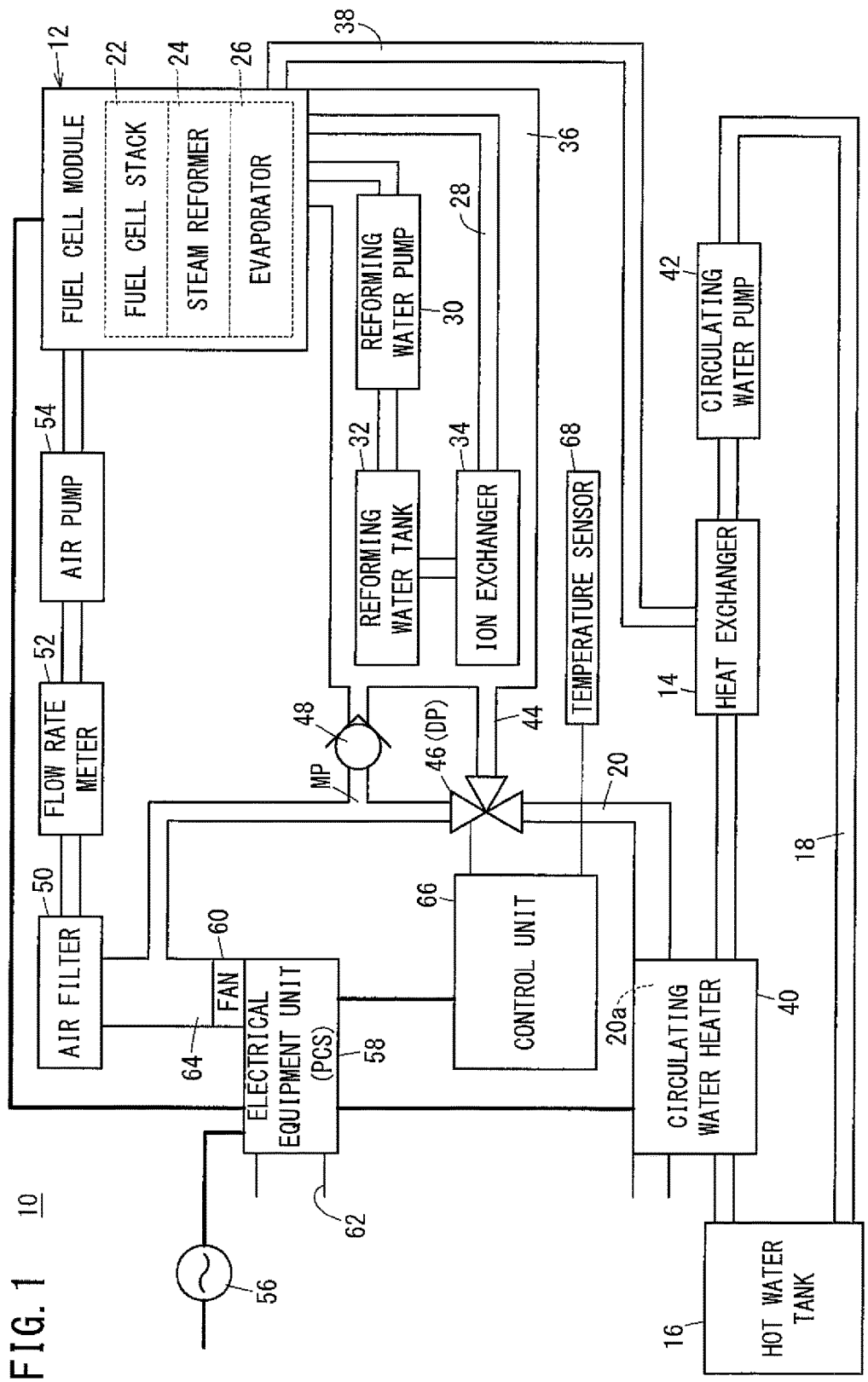
FIG. 1 is a diagram schematically showing structure of a fuel cell cogeneration system according to an embodiment of the present invention.

As shown in FIG. 1, a fuel cell cogeneration system 10 according to an embodiment of the present invention includes a fuel cell module 12, a heat exchanger 14, a hot water tank 16, a circulating water channel 18, and an oxygen-containing gas supply channel 20.

The fuel cell module 12 includes a fuel cell stack 22, a steam reformer 24, and an evaporator 26. The fuel cell stack 22 is formed by stacking a plurality of fuel cells for generating electric power by electrochemical reactions of a fuel gas (mixed gas of hydrogen, methane, and carbon monoxide) and an oxygen-containing gas (air). The fuel cell is a solid oxide fuel cell (SOFC) including an electrolyte electrode assembly (MEA). The electrolyte electrode assembly includes a cathode, an anode, and an electrolyte interposed between the cathode and the anode. For example, the electrolyte is an oxide ion conductor such as stabilized zirconia.

The steam reformer 24 performs steam reforming of a mixed gas of a raw fuel (e.g., city gas) chiefly containing hydrocarbon and water vapor to thereby produce a fuel gas, and supplies the fuel gas to the fuel cell stack 22. The evaporator 26 evaporates reforming water, and supplies the water vapor to the steam reformer 24.

The evaporator 26 is connected to a reforming water pump 30, a reforming water tank 32, and an ion exchanger 34 through a reforming water circulation channel 28. The reforming water pump 30, the reforming water tank 32, and the ion exchanger 34 are housed in a reforming water chamber 36.

The heat exchanger 14 is provided in a circulating water channel 18. The heat exchanger 14 heats water by heat exchange with exhaust heat of an exhaust gas (consumed fuel gas and oxygen-containing gas) discharged from the fuel cell module 12 through an exhaust gas channel 38 to produce hot water. The hot water tank 16 is provided in the circulating water channel 18. The hot water tank 16 discharges water to the circulating water channel 18, and stores the hot water. It should be noted that water from the outside is supplied (replenished) to the hot water tank 16.

The circulating water channel 18 sends the water discharged from the hot water tank 16, to the heat exchanger 14, and returns the hot water obtained in the heat exchanger 14 to the hot water tank 16. Though not shown, the hot water tank 16 supplies the hot water to a hot water supply system or a heating system for home use.

A circulating water heater 40 for heating the water, and a circulating water pump 42 for circulating the water (and the hot water) are provided in the circulating water channel 18. Part 20a of the oxygen-containing gas supply channel 20 is provided in the circulating water heater 40 for allowing the oxygen-containing gas flowing through the oxygen-containing gas supply channel 20 to be heated by receiving heat from the circulating water heater 40.

The oxygen-containing gas supply channel 20 supplies the oxygen-containing gas (air) to the fuel cell module 12. The oxygen-containing gas supply channel 20 includes a bypass channel 44 that diverges from the oxygen-containing gas supply channel 20 at a diverging point DP provided midway in the oxygen-containing gas supply channel 20, extends through the reforming water chamber 36, and then merges with the oxygen-containing gas supply channel 20 at a merging point MP. A three-way valve (switching valve) 46 for allowing the oxygen-containing gas to be supplied to the bypass channel 44 is provided at the diverging point DP. A check valve 48 for preventing back-flow of the oxygen-containing gas from the oxygen-containing gas supply channel 20 back to the bypass channel 44 is provided adjacent to the merging point MP.

In the oxygen-containing gas supply channel 20, an air filter 50, a flow rate meter 52, and an air pump 54 are provided downstream of the merging point MP, in the order recited toward the fuel cell module 12.

The fuel cell cogeneration system 10 is connected to a system power supply 56, and includes an electrical equipment unit (PCS) 58 for controlling electric power. The electrical equipment unit 58 includes an air intake port 62 for taking the external air into the electrical equipment unit 58 by operation of a fan 60, and an electrical-equipment-unit-side oxygen-containing gas supply channel 64 for supplying the air taken into the electrical equipment unit 58 to the fuel cell module 12 through the oxygen-containing gas supply channel 20.

The electrical-equipment-unit-side oxygen-containing gas supply channel 64 is connected to the oxygen-containing gas supply channel 20 at a position upstream of the air filter 50. It should be noted that the electrical-equipment-unit-side oxygen-containing gas supply channel 64 may be connected to the fuel cell module 12 independently (separately) from the oxygen-containing gas supply channel 20 to supply the air (oxygen-containing gas) to the fuel cell module 12.

The fuel cell cogeneration system 10 includes a control unit 66. The control unit 66 controls the entire fuel cell cogeneration system 10, and the control unit 66 is connected to the electrical equipment unit 58, the three-way valve 46, and a temperature sensor 68. The temperature sensor 68 detects the internal temperature of the fuel cell cogeneration system 10, in particular, the internal temperature of the reforming water chamber 36.

Operation of this fuel cell cogeneration system 10 will be described below in relation to a method of starting operation of the fuel cell cogeneration system 10 (start-up method) and a method of operating the fuel cell cogeneration system 10 (operating method) with reference to a flow chart shown in FIG. 2.

Firstly, in step S1, it is determined whether or not operation of the fuel cell module 12 has been started. If it is determined that operation of the fuel cell module 12 has been started (YES in step S1), the routine proceeds to step S2 to determine whether or not the internal temperature of the reforming water chamber 36 is a predetermined temperature T° C. (e.g., 5° C.) or less.

If it is determined that the internal temperature of the reforming water chamber 36 is the predetermined temperature T° C. or less (YES in step S2), the routine proceeds to step S3 and step S4. In step S3, the circulating water heater 40 is turned on. In step S4, the three-way valve 46 is operated to allow the oxygen-containing gas supply channel 20 to be connected to the bypass channel 44 (i.e., open the bypass channel 44 to the oxygen-containing gas supply channel 20). Step S3 and step S4 may be performed at the same time. Alternatively, the process of step S3 and the process of step S4 may be switched.

Figure 3:
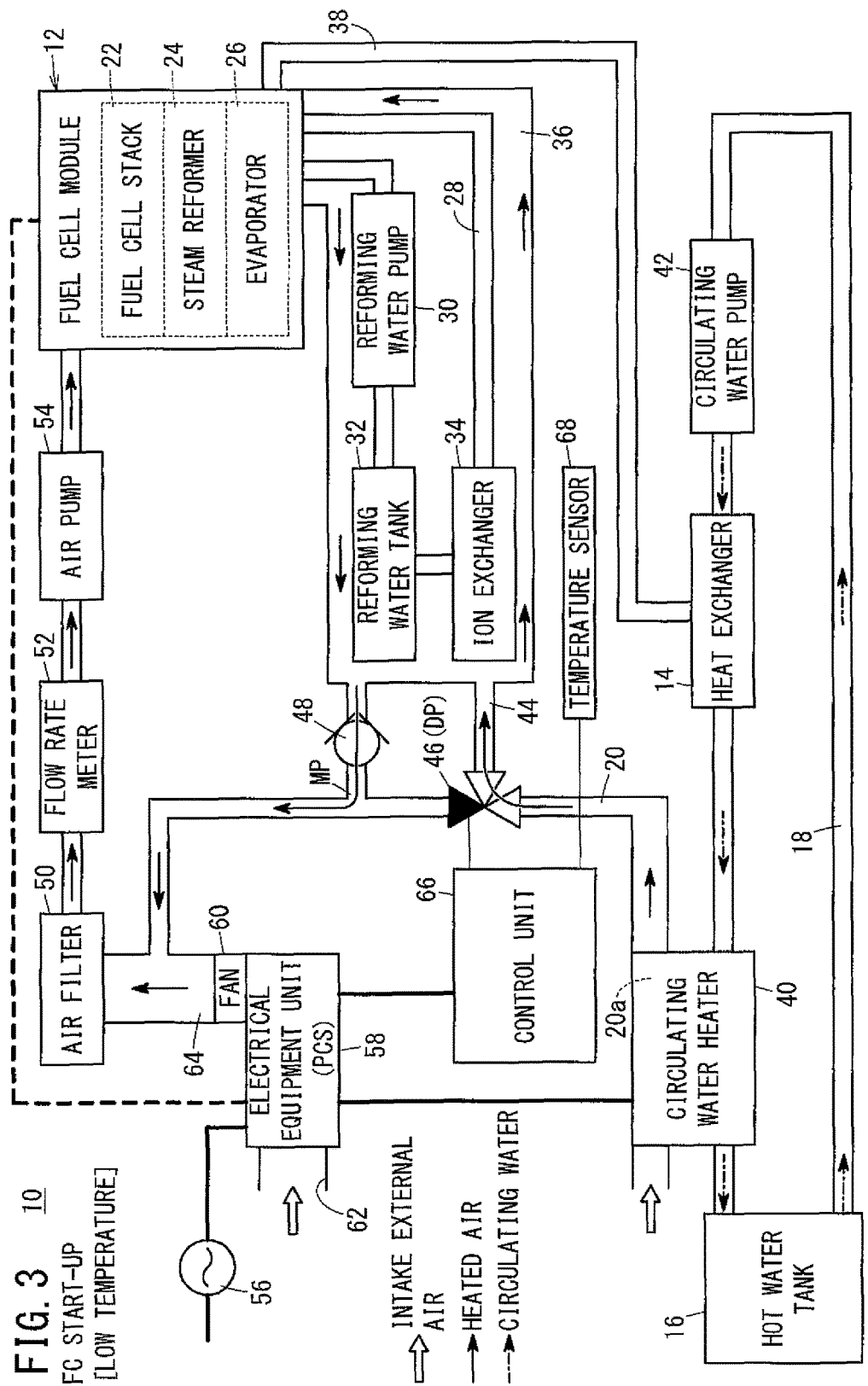
FIG. 3 is an explanatory diagram illustrating starting operation at low temperature.

As shown in FIG. 3, the electrical equipment unit 58 is operated by electric power supplied from the system power supply 56, and the electrical equipment unit 58 operates the circulating water heater 40. Electric power is supplied from the electrical equipment unit 58 to the control unit 66, and the control unit 66 operates the three-way valve 46 based on a temperature signal from the temperature sensor 68. Thus, the water circulating through the circulating water channel 18 and the air flowing through the oxygen-containing gas supply channel 20 are heated by the circulating water heater 40.

After the air flowing through the oxygen-containing gas supply channel 20 is heated, by operation of the three-way valve 46, the air flows from the bypass channel 44 into the reforming water chamber 36. The air flows through the reforming water chamber 36 to heat the reforming water pump 30, the reforming water tank 32, and the ion exchanger 34, and thereafter the air flows from the bypass channel 44 through the check valve 48, and is then returned to the oxygen-containing gas supply channel 20.

After the air is returned to the oxygen-containing gas supply channel 20, the air flows through the air filter 50, the flow rate meter 52, and the air pump 54. Then, the air is supplied to the fuel cell module 12, and heats the fuel cell module 12.

In the meanwhile, in the electrical equipment unit 58, the external air at low temperature taken from the air intake port 62 through the fan 60 is heated by cooling the electrical equipment unit 58. The heated air from the electrical-equipment-unit-side oxygen-containing gas supply channel 64 is merged into the oxygen-containing gas supply channel 20. Then, the air is supplied to the fuel cell module 12.

Figure 2:
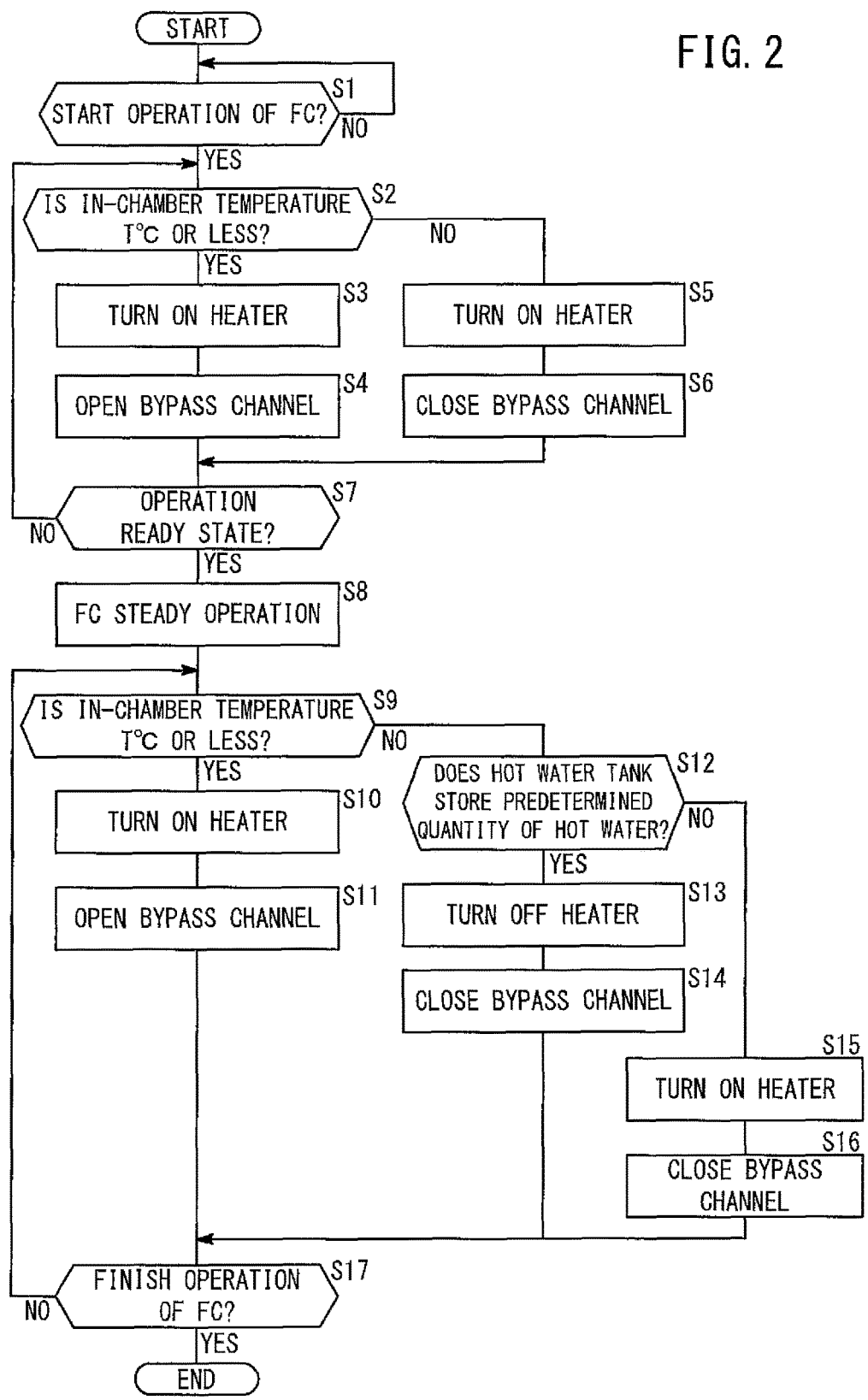
FIG. 2 is a flow chart illustrating a method of starting operation of the fuel cell cogeneration system (start-up method), and a method of operating the fuel cell cogeneration system (operating method)

As shown in FIG. 2, if it is determined that the internal temperature of the reforming water chamber 36 exceeds the predetermined temperature T° C. (NO in step S2), the routine proceeds to step S5 and step S6. In step S5, the circulating water heater 40 is turned on. In step S6, the three-way valve 46 is operated to disconnect the oxygen-containing gas supply channel 20 from the bypass channel 44 (i.e., close the bypass channel 44 with respect to the oxygen-containing gas supply channel 20). Step S5 and step S6 may be performed at the same time. Alternatively, the process of step S5 and the process of step S6 may be switched.

Figure 4:
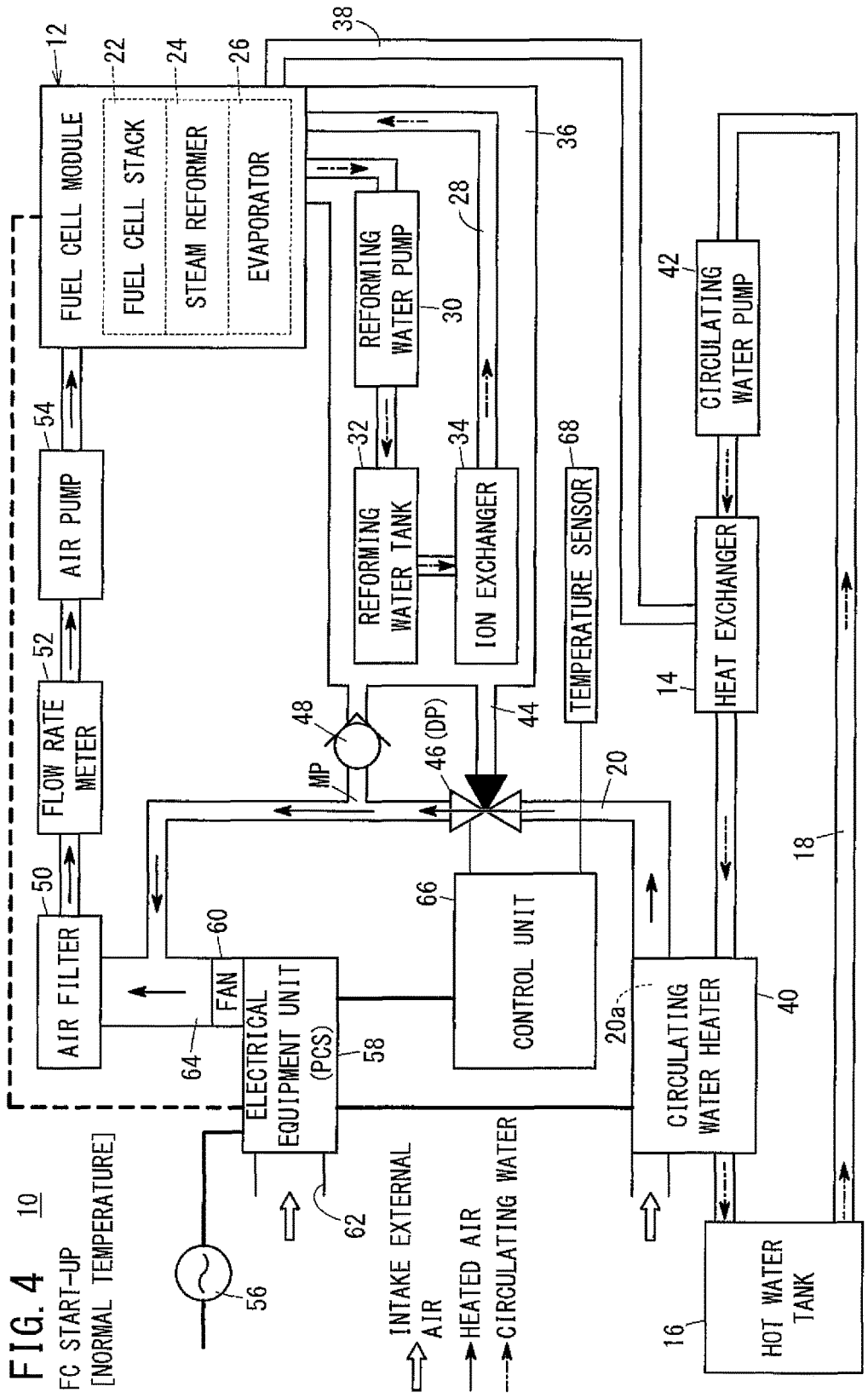
FIG. 4 is an explanatory diagram illustrating starting operation at normal temperature.

As shown in FIG. 4, the water circulating through the circulating water channel 18 and the air flowing through the oxygen-containing gas supply channel 20 are heated through the circulating water heater 40. The heated air flows through the oxygen-containing gas supply channel 20, and the air flows through the air filter 50, the flow rate meter 52, and the air pump 54. Then, the air is supplied to the fuel cell module 12, and heats the fuel cell module 12. In the meanwhile, the air is heated by cooling the electrical equipment unit 58. The heated air is merged into the oxygen-containing gas supply channel 20, and then supplied to the fuel cell module 12.

Next, the routine proceeds to step S7. It is determined whether or not the fuel cell module 12 is in an operation ready state, i.e., it is determined whether or not the fuel cell module 12 is heated to a desired power-generation enabled temperature. If it is determined that the fuel cell module 12 is in the operation ready state (YES in step S7), the routine proceeds to step S8 to start steady operation.

At the time of steady operation of the fuel cell module 12, for example, a raw fuel such as a city gas (containing $CH_4$, $C_2H_6$, $C_3H_8$, $C_4H_{10}$) is supplied to the fuel cell module 12. By operation of the reforming water pump 30, the reforming water in the reforming water tank 32 flows through the ion exchanger 34, and is supplied from the reforming water circulation channel 28 to the evaporator 26. Thus, water vapor is obtained.

In the steam reformer 24, steam reforming of the mixed gas of the water vapor and the raw fuel is performed. As a result, hydrogen carbon of $C_{2+}$ is removed (reformed), and a reformed gas (fuel gas) chiefly containing methane is obtained. This reformed gas is supplied to the fuel cell stack 22. Thus, methane in the reformed gas is reformed to produce a hydrogen gas, and the fuel gas chiefly containing this hydrogen gas is supplied to the anode (not shown).

In the meanwhile, the air supplied to the fuel cell module 12 flows into the fuel cell stack 22, and is supplied to the cathode (not shown). Thus, in the fuel cell stack 22, by electrochemical reactions of the fuel gas and the air, electric power is generated.

Then, the routine proceeds to step S9 to determine whether or not the internal temperature of the reforming water chamber 36 is a predetermined temperature T° C. (e.g., 5° C.) or less. If it is determined that the internal temperature of the reforming water chamber 36 is the predetermined temperature T° C. or less (YES in step S9), the routine proceeds to step S10 and S11.

In step S10, the circulating water heater 40 is turned on. In step S11, the three-way valve 46 is operated to allow the oxygen-containing gas supply channel 20 to be connected to the bypass channel 44 (i.e., open the bypass channel 44 to the oxygen-containing gas supply channel 20). Step 310 and step S11 may be performed at the same time. Alternatively, the process in step 310 and the process in step 311 may be switched.

Figure 5:
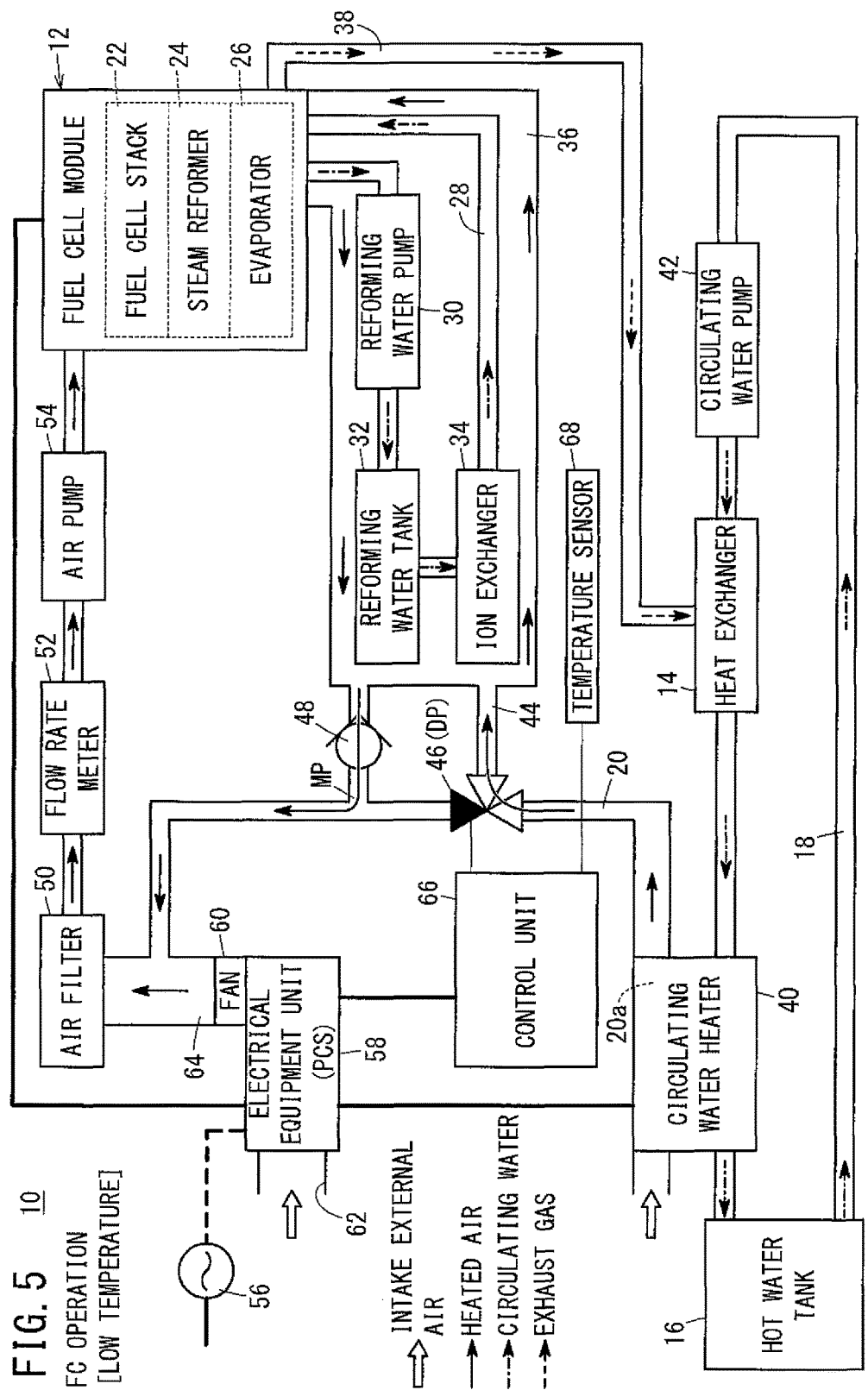
FIG. 5 is an explanatory diagram illustrating operation at low temperature.

As shown in FIG. 5, since the fuel cell module 12 is operated, electric power from this fuel cell module 12 is supplied to the electrical equipment unit 58. In the meanwhile, supply of electric power from the system power supply 56 to the electrical equipment unit 58 is stopped. The circulating water heater 40 is operated by electric power supplied from the electrical equipment unit 58 to the circulating water heater 40.

Electric power is supplied from the electrical equipment unit 58 to the control unit 66. The control unit 66 operates the three-way valve 46 based on the temperature signal from the temperature sensor 68. Thus, the water circulating through the circulating water channel 18 and the air flowing through the oxygen-containing gas supply channel 20 are heated by the circulating water heater 40. It should be noted that the exhaust gas from the fuel cell module 12 is supplied to the heat exchanger 14, and the water circulating through the circulating water channel 18 is heated by heat exchange with the exhaust heat of the exhaust gas.

The air flows through the oxygen-containing gas supply channel 20 and is heated. The heated air flows from the bypass channel 44 through the reforming water chamber 36, and heats the reforming water pump 30, the reforming water tank 32, and the ion exchanger 34. Thereafter, the air is returned to the oxygen-containing gas supply channel 20. This air is mixed with air that has flowed through the electrical equipment unit 58 and has been heated. The mixed air flows through the air filter 50, the flow rate meter 52, and the air pump 54. Then, the air is supplied to the fuel cell module 12, and heats the fuel cell module 12.

As shown in FIG. 2, if it is determined that the internal temperature of the reforming water chamber 36 exceeds the predetermined temperature T° C. (NO in step S9), the routine proceeds to step S12. In step S12, it is determined whether or not the hot water tank 16 stores a predetermined quantity of hot water. If it is determined that the hot water tank 16 stores the predetermined quantity of hot water (YES in step S12), the routine proceeds to step S13 and step S14.

In step S13, the circulating water heater 40 is turned off, and in step S14, the three-way valve 46 is operated to disconnect the oxygen-containing gas supply channel 20 from the bypass channel 44 (i.e., close the bypass channel 44 with respect to the oxygen-containing gas supply channel 20). Step S13 and step S14 may be performed at the same time. Alternatively, the process of step S13 and the process of step S14 may be switched.

As shown in FIG. 6, electric power is supplied from the fuel cell module 12 to the electrical equipment unit 58, and the heated air is supplied to the fuel cell module 12 only from the electrical-equipment-unit-side oxygen-containing gas supply channel 64. Further, the water circulating through the circulating water channel 18 is kept heated by the heat exchange process by the heat exchanger 14, and stored in the hot water tank 16.

As shown in FIG. 2, if it is determined that the hot water tank 16 does not store the predetermined quantity of hot water (NO in step S12), the routine proceeds to step S15 and step S16. In step S15, the circulating water heater 40 is turned on, and in step S16, as in the case of step S14, the three-way valve 46 is operated to disconnect the oxygen-containing gas supply channel 20 from the bypass channel 44 (close the bypass channel 44 with respect to the oxygen-containing gas supply channel 20). Step S15 and step S16 may be performed at the same time. Alternatively, the process of step S15 and the process of step S16 may be switched.

As shown in FIG. 7, electric power is supplied from the fuel cell module 12 to the electrical equipment unit 58, and the circulating water heater 40 is operated by electric power supplied from the electrical equipment unit 58 to the circulating water heater 40. Thus, the air heated by the circulating water heater 40 and the air heated by the electrical equipment unit 58 are supplied to the fuel cell module 12. In the circulating water channel 18, the water is heated by the circulating water heater 40, and the water is heated by the heat exchanger 14.

Further, the routine proceeds to step S17 to determine whether or not operation of the fuel cell module 12 will be finished. If it is determined that operation of the fuel cell module 12 will be finished (YES in step S17), operation control of the fuel cell cogeneration system 10 is finished.

In the embodiment, as shown in FIG. 1, in the fuel cell cogeneration system 10, the circulating water heater 40 is provided on the circulating water channel 18, and part 20a of the oxygen-containing gas supply channel 20 is provided in the circulating water heater 40. Therefore, the air (oxygen-containing gas) flowing through the oxygen-containing gas supply channel 20 receives heat from the circulating water heater 40 and is thus heated, and by the heated air, the fuel cell module 12 can be heated.

Therefore, it becomes possible to suitably reduce the time required for starting operation of the fuel cell module 12. Further, the air can be heated by the circulating water heater 40 used for heating the circulating water, and no dedicated heating apparatus for the oxygen-containing gas is required. Thus, the fuel cell cogeneration system 10 can perform efficient power generation operation economically.

Further, the fuel cell module 12 includes the steam reformer 24, and the fuel cell cogeneration system 10 includes the reforming water chamber 36 containing the reforming water tank 32 storing the reforming water for producing water vapor. Further, the oxygen-containing gas supply channel 20 includes the bypass channel 44 that diverges from the oxygen-containing gas supply channel 20 at the diverging point DP provided midway in the oxygen-containing gas supply channel 20, extends through the reforming water chamber 36, and then merges with the oxygen-containing gas supply channel 20.

In the structure, at a low temperature, the air heated by the circulating water heater 40 is supplied to the bypass channel 44 which diverges from the oxygen-containing gas supply channel 20, and the air flows through the reforming water chamber 36 and then is returned to the oxygen-containing gas supply channel 20. Accordingly, since the heated air flows through the reforming water chamber 36, freezing of the reforming water can be reliably prevented. Further, no heater, thermostat, etc. for preventing freezing of the reforming water chamber 36 is required. Reduction of the size of the facility is achieved, and reduction of the cost is achieved easily, thereby providing the economical system.

Further, the three-way valve 46 as a switching valve for allowing the air to be supplied to the bypass channel 44 is provided at the diverging point DP. Therefore, simply by switching operation of the three-way valve 46, the heated air is easily and reliably supplied to the reforming water chamber 36, and it becomes possible to suppress freezing of the reforming water as much as possible.

Moreover, the fuel cell cogeneration system 10 includes the electrical equipment unit 58 for controlling electric power. The electrical equipment unit 58 includes the air intake port 62 for taking the external air into the electrical equipment unit 58 and the electrical-equipment-unit-side oxygen-containing gas supply channel 64 for supplying the air taken into the electrical equipment unit 58 to the fuel cell module 12 through the oxygen-containing gas supply channel 20.

In the structure, the air that flows through the electrical equipment unit 58 cools the electrical equipment unit 58, and is heated in return. Thereafter, the heated air is supplied to the fuel cell module 12. Thus, since no dedicated air heating apparatus is required, the system is constructed economically, and reduction of the size is achieved easily.

Further, in the start-up method according to the present invention, when it is determined that operation of the fuel cell module 12 has been started, it is determined whether or not the internal temperature of the reforming water chamber 36 is the predetermined temperature T° C. or less. If it is determined that the internal temperature of the reforming water chamber 36 is the predetermined temperature T° C. or less, the circulating water heater 40 is turned on, and the bypass channel 44 is connected (opened) to the oxygen-containing gas supply channel 20.

In the structure, at the time of starting operation at low temperature, the heated air can flow through the reforming water chamber 36 at low temperature, and it becomes possible to prevent freezing of the reforming water. Further, the water flowing through the circulating water channel 18 is heated by the circulating water heater 40, and the hot water tank 16 can store the hot water.

Further, in this start-up method, the air taken into the electrical equipment unit 58 for controlling electric power is supplied to the fuel cell module 12 through the oxygen-containing gas supply channel 20. Thus, no dedicated air heating apparatus is required, so that the system is constructed economically and reduction of the size is achieved easily.

Moreover, in the operating method according to the present invention, if it is determined that the fuel cell module 12 is in a steady operating state, it is determined whether or not the internal temperature of the reforming water chamber 36 is the predetermined temperature T° C. or less. If it is determined that the internal temperature is the predetermined temperature T° C. or less, the circulating water heater 40 is turned on, and the bypass channel 44 is opened (connected) to the oxygen-containing gas supply channel 20.

Thus, during operation at low temperature, the heated air can flow through the reforming water chamber 36 at low temperature, and it becomes possible to prevent freezing of the reforming water. Moreover, the water flowing through the circulating water channel 18 is heated by the circulating water heater 40, and the hot water tank 16 can store the hot water.

Further, in this operating method, if it is determined that the internal temperature of the reforming water chamber 36 is not the predetermined temperature T° C. or less, it is determined whether or not the hot water tank 16 stores a predetermined quantity of hot water. If it is determined that the hot water tank 16 stores the predetermined quantity of hot water, the circulating water heater 40 is turned off, and the bypass channel 44 is disconnected from (closed with respect to) the oxygen-containing gas supply channel 20. Thus, in the heat exchanger 14, the water discharged from the hot water tank 16 is heated by the exhaust heat discharged from the fuel cell module 12, and it becomes possible to keep the hot water in the hot water tank 16 warm.

Further, if it is determined that the hot water tank 16 does not store the predetermined quantity of hot water, the circulating water heater 40 is turned on, and the bypass channel 44 is disconnected from (closed with respect to) the oxygen-containing gas supply channel 20. Thus, since the water circulating through the circulating water channel 18 is heated by the circulating water heater 40, the hot water tank 16 can store the hot water.

Further, in this operating method, the air taken into the electrical equipment unit 58 for controlling electric power is supplied to the fuel cell module 12 through the oxygen-containing gas supply channel 20. Thus, no dedicated air heating apparatus is required, so that the system is constructed economically and reduction of the size is achieved easily.

While the invention has been particularly shown and described with reference to a preferred embodiment, it will be understood that variations and modifications can be effected thereto by those skilled in the art without departing from the scope of the invention as defined by the appended claims.

What is claimed is:
1. A fuel cell cogeneration system comprising:
   a fuel cell module configured to generate electric power by electrochemical reactions of a fuel gas and an oxygen-containing gas;
   a heat exchanger configured to heat water by heat exchange with exhaust heat discharged from the fuel cell module to thereby produce hot water;
   a hot water tank configured to discharge the water and store the hot water;
   a circulating water channel configured to send the water discharged from the hot water tank to the heat exchanger, and return the hot water obtained in the heat exchanger to the hot water tank; and
   an oxygen-containing gas supply channel configured to supply the oxygen-containing gas to the fuel cell module,
   wherein the heat exchanger is provided on the circulating water channel, heats the water coming in from the circulating water channel by heat exchange with exhaust heat discharged from the fuel cell module to thereby produce the hot water, and includes a circulating water heater provided on a downstream side of the heat exchanger on the circulating water channel and configured to heat the water, wherein part of the oxygen-containing gas supply channel is provided in the circulating water heater to thereby allow the oxygen-containing gas flowing through the oxygen-containing gas supply channel to be heated by receiving heat from the circulating water heater, wherein the fuel cell module includes a steam reformer configured to reform a mixed gas of a raw fuel and water vapor to thereby produce the fuel gas, and supply the fuel gas to the fuel cell module, wherein a reforming water chamber housing a reforming water tank is provided, the reforming water tank being configured to store reforming water for producing the water vapor, and wherein the oxygen-containing gas supply channel includes a bypass channel that diverges from the oxygen-containing gas supply channel at a diverging point provided midway in the oxygen-containing gas supply channel, extends through the reforming water chamber, and then merges with the oxygen-containing gas supply channel.

2. The fuel cell cogeneration system according to claim 1, wherein a switching valve configured to allow the oxygen-containing gas to be supplied to the bypass channel is provided at the diverging point.

3. The fuel cell cogeneration system according to claim 1, further comprising an electrical equipment unit configured to control electric power, wherein the electrical equipment unit includes:
an air intake port configured to take an external air into the electrical equipment unit; and
an electrical-equipment-unit-side oxygen-containing gas supply channel configured to supply the air taken into the electrical equipment unit to the fuel cell module through the oxygen-containing gas supply channel or separately from the oxygen-containing gas supply channel.

4. A method of starting operation of a fuel cell cogeneration system, the fuel cell cogeneration system comprising:
a fuel cell module configured to generate electric power by electrochemical reactions of a fuel gas and an oxygen-containing gas;
a steam reformer configured to reform a mixed gas of a raw fuel and water vapor to thereby produce the fuel gas, and supply the fuel gas to the fuel cell module;
a reforming water chamber housing a reforming water tank configured to store reforming water for producing the water vapor;
a heat exchanger configured to heat water by heat exchange with exhaust heat discharged from the fuel cell module to thereby produce hot water;
a hot water tank configured to discharge the water and store the hot water;
a circulating water channel configured to send the water discharged from the hot water tank to the heat exchanger, and return the hot water obtained in the heat exchanger to the hot water tank;
a circulating water heater provided on the circulating water channel and configured to heat the water;
an oxygen-containing gas supply channel configured to supply the oxygen-containing gas to the fuel cell module; and
a bypass channel that diverges from the oxygen-containing gas supply channel, extends through the reforming water chamber, and then merges with the oxygen-containing gas supply channel,
wherein the heat exchanger is provided on the circulating water channel, heats the water coming in from the circulating water channel by heat exchange with exhaust heat discharged from the fuel cell module to thereby produce hot water, the method comprising the steps of:
determining whether or not operation of the fuel cell module has been started;
if it is determined that operation of the fuel cell module has been started, determining whether or not a temperature of the reforming water chamber is a predetermined temperature or less;
if it is determined that the temperature of the reforming water chamber is the predetermined temperature or less, turning on the circulating water heater, and opening the bypass channel to the oxygen-containing gas supply channel so that the oxygen-containing gas flowing from the bypass channel into the reforming water chamber is returned from the reforming water chamber to the oxygen-containing gas supply channel and then is supplied to the fuel cell module; and
if it is determined that the temperature of the reforming water chamber is not the predetermined temperature or less, turning on the circulating water heater, closing the bypass channel with respect to the oxygen-containing gas supply channel, and supplying directly the oxygen-containing gas from the oxygen-containing gas supply channel to the fuel cell module without the oxygen-containing gas entering from the bypass channel to the reforming water chamber.

5. The method of starting operation of the fuel cell cogeneration system according to claim 4, wherein air taken into an electrical equipment unit configured to control electric power is supplied to the fuel cell module through the oxygen-containing gas supply channel or supplied to the fuel cell module separately from the oxygen-containing gas supply channel.

6. A method of operating a fuel cell cogeneration system, the fuel cell cogeneration system comprising:
a fuel cell module configured to generate electric power by electrochemical reactions of a fuel gas and an oxygen-containing gas;
a steam reformer configured to reform a mixed gas of a raw fuel and water vapor to thereby produce the fuel gas, and supply the fuel gas to the fuel cell module;
a reforming water chamber housing a reforming water tank configured to store reforming water for producing the water vapor;
a heat exchanger configured to heat water by heat exchange with exhaust heat discharged from the fuel cell module to thereby produce hot water;
a hot water tank configured to discharge the water and store the hot water;
a circulating water channel configured to send the water discharged from the hot water tank to the heat exchanger, and return the hot water obtained in the heat exchanger to the hot water tank;
an oxygen-containing gas supply channel configured to supply the oxygen-containing gas to the fuel cell module; and
a bypass channel that diverges from the oxygen-containing gas supply channel, extends through the reforming water chamber, and then merges with the oxygen-containing gas supply channel,
wherein the heat exchanger is provided on the circulating water channel, heats the water coming in from the circulating water channel by heat exchange with exhaust heat discharged from the fuel cell module to thereby produce hot water, and includes a circulating water heater provided on a downstream side of the heat exchanger on the circulating water channel and configured to heat the water, the method comprising the steps of:

determining whether the fuel cell module is in a steady operating state;

if it is determined that the fuel cell module is in the steady operating state, determining whether or not a temperature of the reforming water chamber is a predetermined temperature or less; and if it is determined that the temperature of the reforming water chamber is the predetermined temperature or less, turning on the circulating water heater, and opening the bypass channel to the oxygen-containing gas supply channel so that the oxygen-containing gas flowing from the bypass channel into the reforming water chamber is returned from the reforming water chamber to the oxygen-containing gas supply channel and then is supplied to the fuel cell module.

7. The method of operating the fuel cell cogeneration system according to claim 6, further comprising the steps of:

if it is determined that the temperature of the reforming water chamber is not the predetermined temperature or less, determining whether or not the hot water tank stores a predetermined quantity of hot water;

if it is determined that the hot water tank stores the predetermined quantity of hot water, turning off the circulating water heater, and closing the bypass channel with respect to the oxygen-containing gas supply channel; and if it is determined that the hot water tank does not store the predetermined quantity of hot water, turning on the circulating water heater, closing the bypass channel with respect to the oxygen-containing gas supply channel, and supplying directly the oxygen-containing gas from the oxygen-containing gas supply channel to the fuel cell module without the oxygen-containing gas entering from the bypass channel to the reforming water chamber.

8. The method of operating the fuel cell cogeneration system according to claim 7, wherein air taken into an electrical equipment unit configured to control electric power is supplied to the fuel cell module through the oxygen-containing gas supply channel or supplied to the fuel cell module separately from the oxygen-containing gas supply channel.

* * * * *